United States Patent
Agrawal et al.

(10) Patent No.: US 10,397,392 B2
(45) Date of Patent: Aug. 27, 2019

(54) SUPPRESSING DEVICE NOTIFICATION MESSAGES WHEN CONNECTED TO A NON-USER-SPECIFIC DEVICE

(71) Applicant: Motorola Mobility LLC, Chicago, IL (US)

(72) Inventors: Amit Kumar Agrawal, Bangalore (IN); Vishal Patil, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/194,947

(22) Filed: Nov. 19, 2018

(65) Prior Publication Data

US 2019/0166245 A1 May 30, 2019

(30) Foreign Application Priority Data

Nov. 29, 2017 (IN) .............................. 201711042867

(51) Int. Cl.
*H04W 4/12* (2009.01)
*H04W 68/00* (2009.01)
*H04M 1/725* (2006.01)

(52) U.S. Cl.
CPC ..... *H04M 1/72552* (2013.01); *H04M 1/7253* (2013.01); *H04W 4/12* (2013.01); *H04W 68/005* (2013.01); *H04M 1/72597* (2013.01); *H04M 2201/39* (2013.01)

(58) Field of Classification Search
CPC ............. H04M 1/6058; H04M 1/6066; H04M 1/6075; H04M 1/6083; H04M 1/6091
See application file for complete search history.

(56) References Cited

U.S. PATENT DOCUMENTS

| | | | |
|---|---|---|---|
| 2006/0286969 A1* | 12/2006 | Talmor | G06F 21/32 455/415 |
| 2014/0365569 A1* | 12/2014 | Vyrros | H04W 4/12 709/204 |
| 2016/0261532 A1* | 9/2016 | Garbin | H04L 51/04 |
| 2017/0094638 A1* | 3/2017 | Borges | H04L 67/322 |
| 2019/0007546 A1* | 1/2019 | Anderson | H04M 1/72569 |

* cited by examiner

*Primary Examiner* — Joshua L Schwartz
(74) *Attorney, Agent, or Firm* — Amerson Law Firm, PLLC

(57) ABSTRACT

A method includes generating an alert message in a device. The device is one of a plurality of connected devices. The alert message is suppressed in the device responsive to a state of a microphone of any of the plurality of connected devices indicating an active state. A device includes a microphone, a speaker, and a processor coupled to the microphone and the speaker. The processor is to generate an alert message and suppress the alert message responsive to a state of a microphone of any of a plurality of connected devices including the device indicating an active state.

20 Claims, 2 Drawing Sheets

SUPPRESSING DEVICE NOTIFICATION MESSAGES WHEN CONNECTED TO A NON-USER-SPECIFIC DEVICE

BACKGROUND

Field of the Disclosure

The disclosed subject matter relates generally to mobile computing systems and, more particularly, to suppressing device notification messages when connected to a non-user-specific device.

Description of the Related Art

Various alert techniques are used in mobile devices to inform users of incoming activity, including text messages, email messages, voice calls, video conference calls, etc. Alert tones, vibrations, or voice alerts may be used to indicate incoming events.

One type of alert mechanism is commonly referred to as voice assist. To facilitate safer user interactions during activities, such as driving, a voice assist service typically announces an incoming notification and queries the user for a response. For example, the voice assist service may announce, "You have an incoming text message from John Doe. Would you like me to read it?" or "You have an incoming call from Jane Doe. Would you like me to answer it?"

In some instances, a user may be engaged in activity where such incoming voice-assist message may be disruptive or may reduce privacy. For example, the user may have connected the mobile device to a remote audio playback device (e.g., automobile or a remote speaker) that is associated with another user, or alternatively the mobile device may be connected to a plurality of remote audio playback devices in parallel. In either case, the remote audio playback device or devices can be characterized as being non-user-specific, as any voice-assist alerts could be heard by other individuals than the designated user of the mobile device. The user may not want the information in the text message or the party associated with the incoming alert to be made known.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF EMBODIMENT(S)

Figure 1:
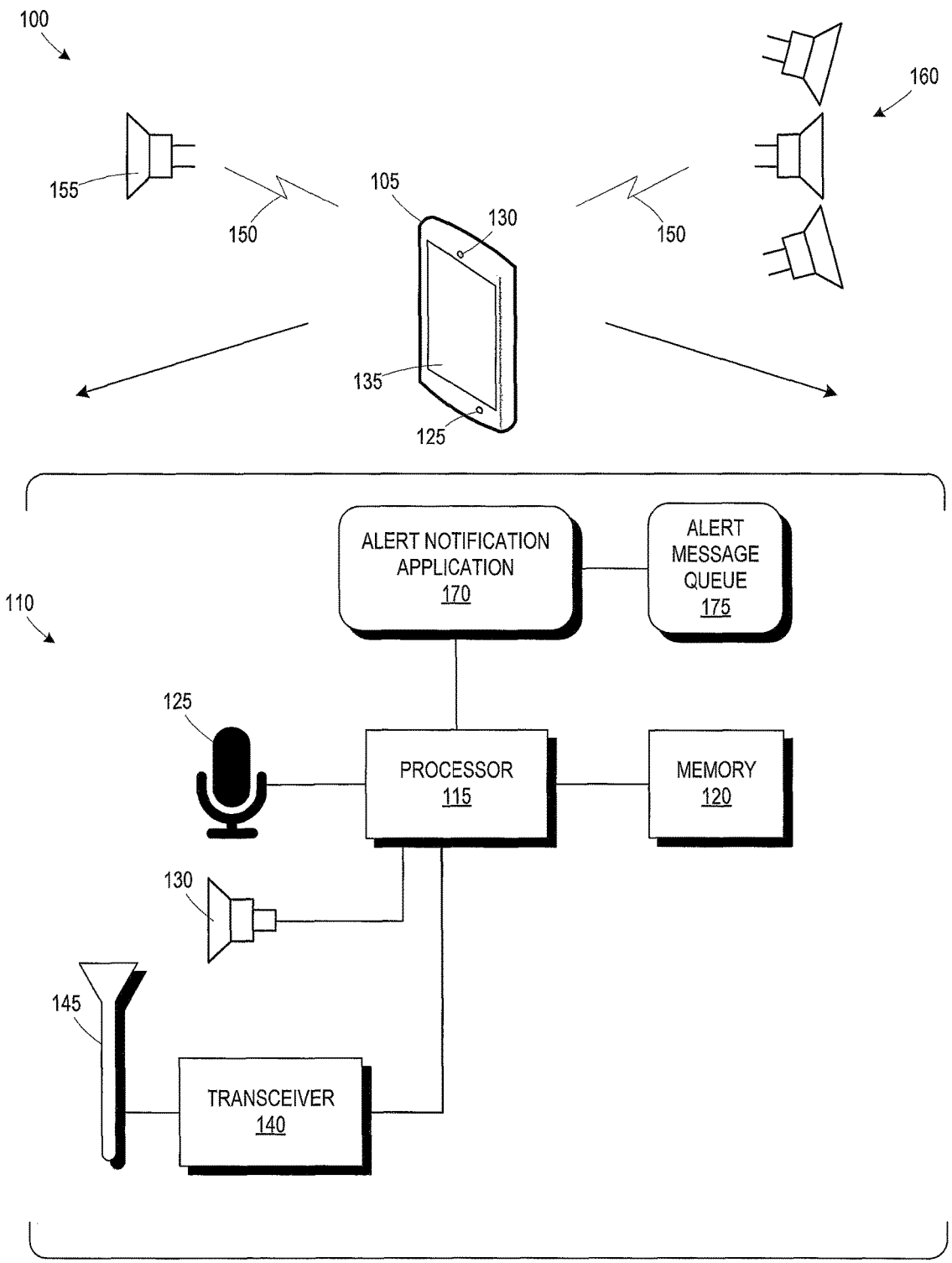
FIG. 1 is a simplified block diagram of a communication system for queueing audio alert events, according to some embodiments disclosed herein.
Figure 2:
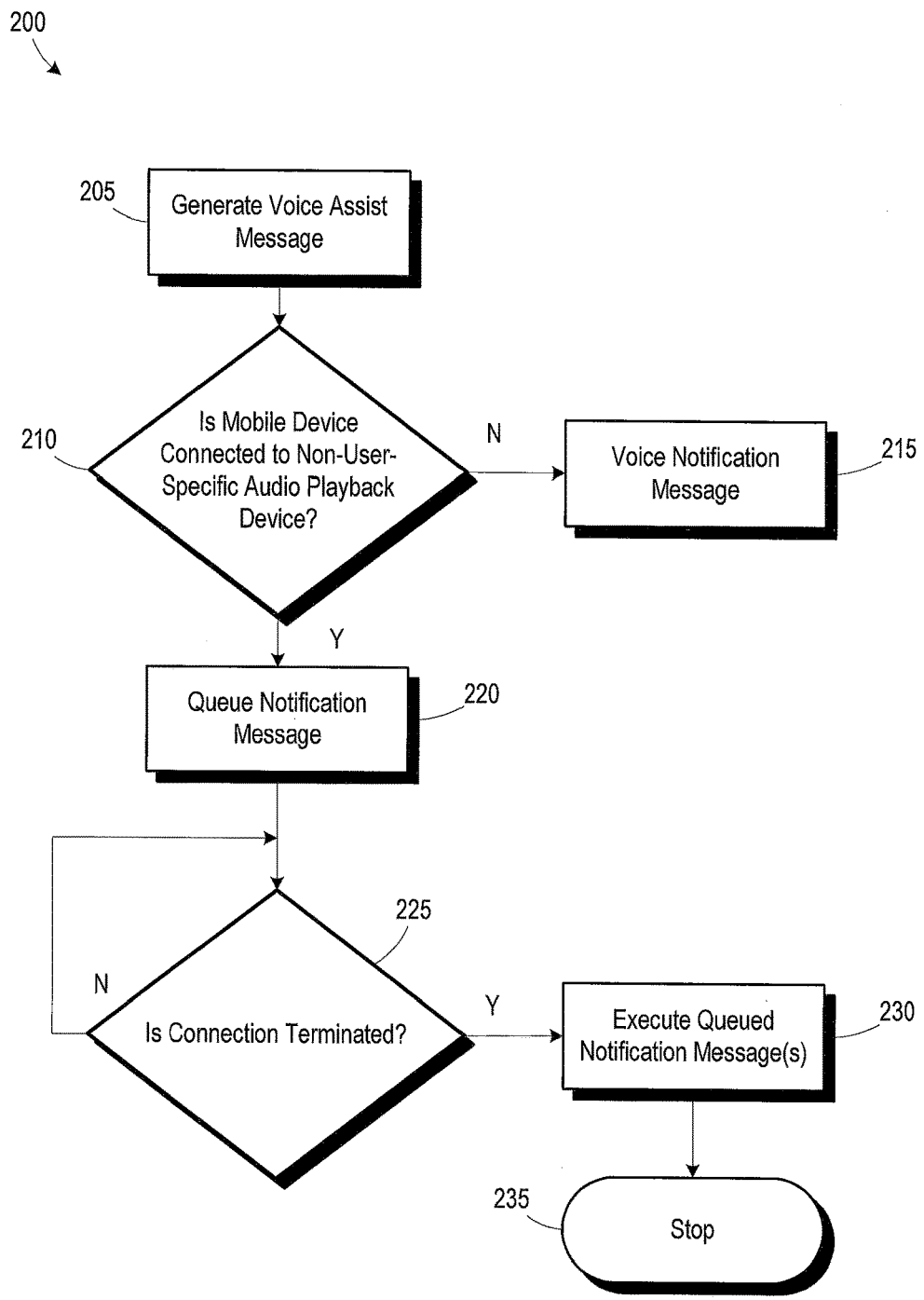
FIG. 2 is a flow diagram of a method for queueing voice assist notification messages when a mobile device is connected to a non-user-specific audio playback device, according to some embodiments disclosed herein The use of the same reference symbols in different drawings indicates similar or identical items.

FIGS. 1-2 illustrate example techniques for suppressing voice assist notification messages during periods of connectivity to non-user specific audio playback devices, such as an audio playback device owned by a different user or a plurality of audio playback devices. To enhance privacy and/or to reduce interference with a user's current activity, voice assist notification messages may be suppressed or queued during periods of such connectivity.

FIG. 1 is a simplistic block diagram of a communications system 100 including a mobile device 105. The mobile device 105 implements a computing system 110 including, among other things, a processor 115, a memory 120, a microphone 125, a speaker 130, and a display 135. The memory 120 may be a volatile memory (e.g., DRAM, SRAM) or a non-volatile memory (e.g., ROM, flash memory, hard disk, etc.). The mobile device 105 includes a transceiver 140 for transmitting and receiving signals via an antenna 145 over a communication link 150. The transceiver 140 may include one or more radios for communicating according to different radio access technologies, such as cellular, Wi-Fi, Bluetooth®, etc.

As illustrated in FIG. 1, the mobile device 105 may connect to one more remote audio playback devices 155, 160. The remote audio playback device 155 represents a single audio playback devices 155, and the remote audio playback devices 160 represent a group of devices that may be connected to the mobile device 105 in parallel.

In the mobile device 105, the processor 115 may execute instructions stored in the memory 120 and store information in the memory 120, such as the results of the executed instructions. Some embodiments of the processor 115 and the memory 120 may be configured to implement an alert notification application 170 and perform portions of the method 200 shown in FIG. 2 and discussed below. For example, the processor 115 may execute the alert notification application 170 to detect and suppress the messages or, alternatively, queue the alert messages in an alert message queue 175. In one example, the alert notification application 170 may be part of a voice assist application or feature of the device 105.

FIG. 2 is a flow diagram of an illustrative method 200 for queuing voice assist notification messages during periods of connectivity to non-user-specific audio playback devices, in accordance with some embodiments disclosed herein. In general, one or more of the audio playback devices 155, 160 may be associated with an individual other than a designated user of the mobile device 105.

The non-user-specific nature of the audio playback devices 155, 160 may be determined explicitly based on user setting data or implicitly based on the number of audio playback devices 160 connected in parallel. For example, when the mobile device 105 first connects to a new audio playback device 155, 160, a pairing process is typically conducted. During the pairing process, the mobile device 105 may prompt the user to determine if the device being paired is owned by the user of the mobile device 105 or to another party. The mobile device 105 may store a parameter indicating the user-specific or non-user-specific characteristics of the audio playback device 155, 160. The non-user-specific nature of the audio playback devices 160 may be inferred by the mobile device 105 based on more than one audio playback device being connected in parallel. In this instance, the non-user-specific nature is not directed specifically at ownership, but rather, the audio playback devices 160 are non-user-specific in terms of exposure, since with multiple audio playback devices 160 being present, it is more likely that a non-user may be present to hear any voice assist messages. In some embodiments, the mobile device 105 may prompt the user when a connection to multiple audio playback devices 160 is instantiated (not just paired, but every time the connection is made) to determine whether the audio playback devices 160 should be designated as non-user-specific. This querying may be overridden by the user in some cases with an explicit parameter setting.

In method block 205, a notification message is generated. For example, the notification message may be generated based on the alert notification application 170 identifying an incoming email, text message, telephone call, video call, or other event that is configured to be handled by sending a voice assist message to the user. For example, the notification message may be implemented by a voice engine in the alert notification application 170 that states, "You have an incoming text message from John Doe. Would you like me to read it?" or "You have an incoming call from Jane Doe. Would you like to answer it?"

In some embodiments, the mobile device 105 may prompt the user regarding the non-user-specific nature of the audio playback device(s) 155, 160 after the voice assist message is generated in method block 210.

In method block 210, the alert notification application 170 determines if the mobile device 105 is connected to a non-user-specific audio playback device 155, 160 (e.g., connected to an audio playback device 155 that is owned by another individual or connected to a plurality of audio playback devices 160). If the mobile device 105 is not connected to a non-user-specific audio playback device 155, 160 in method block 210, the notification message is voiced in method block 215. In some embodiments, the notification message may be voiced over the audio playback device 155, 160 and a response from the user may be detected using the audio playback device 155, 160 or the microphone 125 (i.e., for voice assist notification messages that also query the user for input). The voicing of the notification message may also include voicing content associated with the notification message, such as the content of the incoming email.

If the mobile device 105 is connected to a non-user-specific audio playback device 155, 160 in method block 210, the voice assist message is queued in method block 220 (i.e., in the alert message queue 175 of FIG. 1).

The connection state of the mobile device 105 is monitored in method block 225 until the connection to a non-user-specific audio playback device 155, 160 becomes inactive. Other new incoming voice assist messages may also be stored in the queue 175 during the monitoring of method block 225. The connection state may be evaluated periodically (e.g., every N seconds).

When the mobile device 105 is no longer connected to a non-user-specific audio playback device 155, 160 in method block 225, any voice assist messages in the queue 175 are executed in method block 230. In some embodiments, the user may be queried after the connection state is determined in method block 225 as to whether the queued voice assist messages should be executed immediately or held for an additional time period. A delay may be inserted between the queued messages as they executed to allow for the user to be queried and each voice assist event to be addressed according to the input. In a case where the queued notification message was related to an immediate event, such as an incoming communication request (e.g., phone call or video call), the voice assist notification message may be altered when executed. For example, the notification message may be changed as follows: "You had an incoming call from Jane Doe. Would you like to return the call?"

The method terminates in method block 235.

Suppressing and/or queueing notification messages based on the connection state of the mobile device 105 with respect to a non-user-specific audio playback device 155, 160 enhances user privacy and reduces interference with a user's current activity. Private aspects of the incoming notifications will not be communicated to other individuals proximate the user.

In some embodiments, certain aspects of the techniques described above may implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes establishing a first connection between a first device and a first audio playback device. A notification message is generated in the first device while the first device is in a voice assist mode of operation. A readout of the notification message using the first connection is suppressed responsive to determining that the first audio playback device is a non-user-specific device.

A method includes establishing a plurality of concurrent connections between a first device and a plurality of second devices. A notification message is generated in the first device while the first device is in a readout mode of operation. A readout of the notification message using the plurality of concurrent connections is suppressed responsive to determining an active state of the plurality of concurrent connections.

A device includes a transceiver to establish a first connection to a first audio playback device and a processor coupled to the transceiver to generate a notification message while the device is in a voice assist mode of operation and suppress a readout of the notification message over the first connection responsive to determining that the first audio playback device is a non-user-specific device.

A device includes a transceiver to establish a plurality of concurrent connections between a first device and a plurality of second devices and a processor coupled to the transceiver to generate a notification message while the device is in a readout mode of operation and suppress a readout of the notification message using the plurality of concurrent connections responsive to determining an active state of the plurality of concurrent connections.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
   establishing a first connection between a first device and a first audio playback device;
   generating a notification message in the first device while the first device is in a voice assist mode of operation; and
   suppressing a readout of the notification message using the first connection responsive to determining that the audio playback device is a non-user-specific device.

2. The method of claim 1, further comprising:
   establishing a second connection to a second audio playback device concurrent with the first connection; and
   suppressing the readout of the notification message using the first connection and the second connection responsive to determining the concurrent presence of the first and second connections.

3. The method of claim 1, wherein the first connection comprises a wireless point-to-point connection.

4. The method of claim 1, further comprising prompting the user for a readout preference after generating the notification message and prior to suppressing the readout of the notification message.

5. The method of claim 1, further comprising:
   storing the notification message in a queue; and
   replaying the notification message responsive to determining the absence of the first connection between the mobile device and the first audio playback device.

6. The method of claim 5, further comprising prompting the user for a readout preference prior to replaying the notification message.

7. The method of claim 1, wherein determining that the first audio playback device is a non-user-specific device comprises querying the user to determine whether the first audio playback device is associated with the user when establishing the first connection.

8. A method, comprising:
   establishing a plurality of concurrent connections between a first device and a plurality of second devices;
   generating a notification message in the first device while the first device is in a readout mode of operation; and
   suppressing a readout of the notification message using the plurality of concurrent connections responsive to determining an active state of the plurality of concurrent connections.

9. The method of claim 8, further comprising prompting the user for a readout preference after generating the notification message and prior to suppressing the readout of the notification message.

10. The method of claim 8, further comprising:
    storing the notification message in a queue; and
    replaying the notification message responsive to determining an inactive state of the plurality of concurrent connections.

11. A device, comprising:
    a transceiver to establish a first connection to a first audio playback device;
    a processor coupled to the transceiver to generate a notification message while the device is in a voice assist mode of operation and suppress a readout of the notification message over the first connection responsive to determining that the first audio playback device is a non-user-specific device.

12. The device of claim 11, wherein the transceiver is to establish a second connection to a second audio playback device concurrently with the first connection, and the processor is to suppress the readout of the notification message using the first connection and the second connection responsive to determining the concurrent presence of the first and second connections.

13. The device of claim 11, wherein the first connection comprises a wireless point-to-point connection.

14. The device of claim 11, wherein the processor is to prompt the user for a readout preference after generating the notification message and prior to suppressing the readout of the notification message.

15. The device of claim 11, wherein the processor is to store the notification message in a queue and replay the notification message responsive to determining the absence of the first connection.

16. The device of claim 15, wherein the processor is to prompt the user for a readout preference prior to replaying the notification message.

17. The device of claim 11, wherein the processor is to determine that the first audio playback device is a non-user-specific device by querying the user to determine whether the first audio playback device is associated with the user when establishing the first connection.

18. A device, comprising:
    a transceiver to establish a plurality of concurrent connections between a first device and a plurality of second devices; and
    a processor coupled to the transceiver to generate a notification message while the device is in a readout mode of operation and suppress a readout of the notification message using the plurality of concurrent connections responsive to determining an active state of the plurality of concurrent connections.

19. The device of claim 18, wherein the processor is to prompt the user for a readout preference after generating the notification message and prior to suppressing the readout of the notification message.

20. The device of claim 18, wherein the processor is to store the notification message in a queue and replay the notification message responsive to determining an inactive state of the plurality of concurrent connections.

* * * * *